US012337654B2

(12) United States Patent
Wijaya et al.

(10) Patent No.: US 12,337,654 B2
(45) Date of Patent: Jun. 24, 2025

(54) AIR DELIVERY SYSTEM FOR A VEHICLE

(71) Applicant: Ford Global Technologies, LLC, Dearborn, MI (US)

(72) Inventors: Halim Wijaya, Westland, MI (US); Alan Gutowski, Wixom, MI (US); Manfred Koberstein, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 483 days.

(21) Appl. No.: 17/972,855

(22) Filed: Oct. 25, 2022

(65) Prior Publication Data

US 2024/0131898 A1 Apr. 25, 2024
US 2024/0227501 A9 Jul. 11, 2024

(51) Int. Cl.
*B60H 1/00* (2006.01)

(52) U.S. Cl.
CPC ..... *B60H 1/00849* (2013.01); *B60H 1/00764* (2013.01); *B60H 1/00871* (2013.01)

(58) Field of Classification Search
None
See application file for complete search history.

(56) References Cited

U.S. PATENT DOCUMENTS

| | | | | |
|---|---|---|---|---|
| 5,553,776 A | * | 9/1996 | Davis, Jr. | G05B 13/0275 236/44 C |
| 5,954,577 A | * | 9/1999 | Meckler | B60H 3/0625 454/75 |
| 6,170,274 B1 | * | 1/2001 | Ichishi | B60H 1/247 454/313 |
| 8,939,823 B2 | * | 1/2015 | Kanemaru | B60H 1/00764 454/75 |
| 2012/0077426 A1 | * | 3/2012 | Dage | B60H 1/00849 454/75 |
| 2012/0312520 A1 | * | 12/2012 | Hoke | B60N 2/5628 219/217 |
| 2017/0190234 A1 | * | 7/2017 | Maeng | B60H 1/00849 |
| 2020/0346519 A1 | * | 11/2020 | Haupt | B60H 1/00685 |
| 2020/0406701 A1 | * | 12/2020 | Barbier | B60H 1/26 |
| 2021/0146752 A1 | * | 5/2021 | Lee | B60H 1/00028 |
| 2021/0162838 A1 | * | 6/2021 | Thiel | B60H 1/00271 |
| 2021/0245575 A1 | * | 8/2021 | Yoshino | B60H 1/00742 |
| 2022/0314957 A1 | * | 10/2022 | Salter | B60Q 9/00 |

* cited by examiner

*Primary Examiner* — Ko-Wei Lin
(74) *Attorney, Agent, or Firm* — Vichit Chea; Price Heneveld LLP

(57) ABSTRACT

A vehicle includes a body, a cabin that is defined by the body, an air delivery system, and a controller. The air delivery system includes a blower, an air register, ductwork, and an intake module. The air register is positioned within the cabin. The ductwork extends between the blower and the air register. The intake module is positioned upstream of the blower. The controller adjusts a speed of the blower as a function of a speed of the vehicle.

16 Claims, 7 Drawing Sheets

AIR DELIVERY SYSTEM FOR A VEHICLE

FIELD OF THE DISCLOSURE

The present disclosure generally relates to a vehicle. More specifically, the present disclosure relates to an air delivery system for a vehicle.

BACKGROUND OF THE DISCLOSURE

Air delivery systems are often provided in vehicles. Additional solutions are needed that enable the air delivery system to meet the desires of consumers in various climate situations.

SUMMARY OF THE DISCLOSURE

According to a first aspect of the present disclosure, a vehicle includes a body, a cabin that is defined by the body, an air delivery system, and a controller. The air delivery system includes a blower, an air register, ductwork, and an intake module. The air register is positioned within the cabin. The ductwork extends between the blower and the air register. The intake module is positioned upstream of the blower. The controller adjusts a speed of the blower as a function of a speed of the vehicle.

Embodiments of the first aspect of the disclosure can include any one or a combination of the following features:
- the controller decreases the speed of the blower as the speed of the vehicle increases;
- the intake module includes a housing that defines a cavity, a first cabin air aperture defined by the housing, a first cabin air door that is movable between an open position and a closed position relative to the first cabin air aperture, an external air aperture defined by the housing, and an external air door that is movable between an open position and a closed position relative to the external air aperture;
- the controller gradually decreases the speed of the blower as the speed of the vehicle increases such that the speed of the blower reaches a minimum speed that is greater than zero as the vehicle reaches a threshold speed, wherein as the speed of the vehicle exceeds the threshold speed, a position of the external air door relative to the external air aperture is adjusted;
- as the speed of the vehicle exceeds the threshold speed, a cross-sectional overlap between the external air door and the external air aperture is increased;
- the intake module includes a second cabin air aperture defined by the housing and a second cabin air door that is movable between an open position and a closed position relative to the second cabin air aperture;
- the first cabin air door and the second cabin air door are each in the closed position and the external air door is in the open position during an outside air mode of operation of the air delivery system;
- the controller increases a cross-sectional overlap between the external air door and the external air aperture as the speed of the vehicle increases;
- the first cabin air door and the second cabin air door are each in the open position and the external air door is in the closed position during a recirculation mode of operation of the air delivery system;
- the first cabin air door and the external air door are each in the open position and the second cabin air door is in the closed position during a partial recirculation mode of operation of the air delivery system;
- the controller increases a cross-sectional overlap between the external air door and the external air aperture as the speed of the vehicle increases; and
- the cavity is divided into a first chamber and a second chamber when the first cabin air door is in the open position.

According to a second aspect of the present disclosure, a vehicle includes a body, a cabin that is defined by the body, an air delivery system, and a controller. The air delivery system includes a blower, an air register positioned within the cabin, ductwork, and an intake module. The ductwork extends between the blower and the air register. The intake module is positioned upstream of the blower. The intake module includes a housing that defines a cavity, a first cabin air aperture that is defined by the housing, a first cabin air door, an external air aperture defined by the housing, and an external air door. The first cabin air door is movable between an open position and a closed position relative to the first cabin air aperture. The external air door is movable between an open position and a closed position relative to the external air aperture. The controller adjusts at least one parameter as a function of a speed of the vehicle. The at least one parameter is chosen from a speed of the blower and a position of the external air door.

Embodiments of the second aspect of the present disclosure can include any one or a combination of the following features:
- wherein the controller gradually decreases the speed of the blower as the speed of the vehicle increases such that the speed of the blower reaches a minimum speed that is greater than zero when the speed of the vehicle reaches a threshold speed;
- the controller increases a cross-sectional overlap between the external air door and the external air aperture as the speed of the vehicle increases beyond the threshold speed;
- the intake module includes a second cabin air aperture defined by the housing and a second cabin air door that is movable between an open position and a closed position relative to the second cabin air aperture;
- the first cabin air door and the second cabin air door are each in the closed position and the external air door is in the open position during an outside air mode of operation of the air delivery system;
- the first cabin air door and the second cabin air door are each in the open position and the external air door is in the closed position during a recirculation mode of operation of the air delivery system;
- the first cabin air door and the external air door are each in the open position and the second cabin air door is in the closed position during a partial recirculation mode of operation of the air delivery system; and
- the cavity is divided into a first chamber and a second chamber when the first cabin air door is in the open position.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
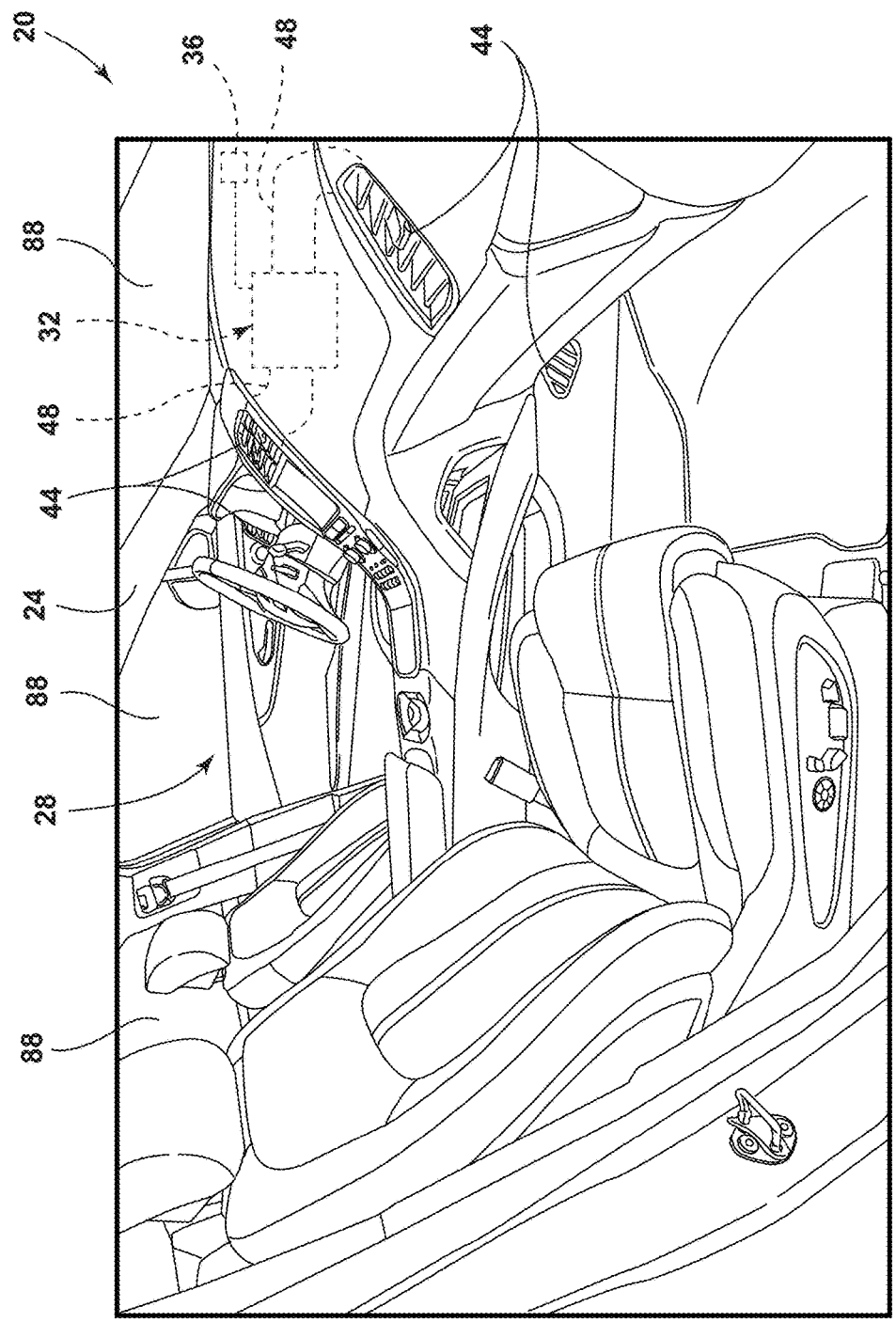
FIG. 1 is a side perspective view of a cabin of a vehicle, illustrating an air delivery system therein, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to an air delivery system for a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical dements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about," It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context dearly indicates otherwise.

Referring to FIGS. 1-7, reference numeral 20 generally designates a vehicle. The vehicle 20 includes a body 24, a cabin 28 that is defined by the body 24, an air delivery system 32, and a controller 36. The air delivery system 32 includes a blower 40, an air register 44 positioned within the cabin 28, ductwork 48, and an intake module 52. The ductwork 48 extends between the blower 40 and the air register 44. The intake module 52 is positioned upstream of the blower 40. In various examples, the intake module may include a housing 56 that defines a cavity 60, a first cabin air aperture 64 that is defined by the housing 56, a first cabin air door 68, an external air aperture 72 defined by the housing 56, and an external air door 76. The first cabin air door 68 is movable between an open position (see FIGS. 6 and 7) and a closed position (see FIG. 5) relative to the first cabin air aperture 64. The external air door 76 is movable between an open position (see FIGS. 5 and 6) and a closed position (see FIG. 7) relative to the external air aperture 72. In some examples, the housing 56 of the intake module 52 may define a second cabin air aperture 80. In such an example, the intake module 52 may include a second cabin air door 84 that is movable between an open position (see FIG. 7) and a closed position (see FIGS. 5 and 6) relative to the second cabin air aperture 80. The controller 36 adjusts at least one parameter as a function of a speed of the vehicle 20. For example, the at least one parameter may be chosen from a speed of the blower 40 and a position of the external air door 76. In some examples, the first cabin air door 68 may be a first recirculation door and the second cabin air door 84 may be a second recirculation door.

Referring again to FIG. 1, the vehicle 20 may be a motor vehicle. For example, the vehicle 20 may be a land-based vehicle (e.g., an automobile, a motorcycle, a train, etc.), an air-based vehicle (e.g., an airplane, a helicopter, etc.), and/or a water-based vehicle (e.g., a boat or other watercraft). While the vehicle 20 may be a motor vehicle, the present disclosure is not limited to internal combustion engines as a source of locomotive power for the vehicle 20. Rather, alternative sources may be utilized in providing locomotive power to the vehicle 20. For example, locomotive power may be provided to the vehicle 20 by electric motors, fuel cells, and/or petroleum-based fuel engines. According to various examples, the vehicle 20 may be driver-controlled, semi-autonomous, fully-autonomous, or any combination of user-controlled and automated. For example, the semi-autonomous example of the vehicle 20 may perform many, or all, commuting independent of user interaction while the user maintains override control of the vehicle 20.

Referring further to FIG. 1, the air delivery system 32 can be part of a heating, ventilation, and air conditioning (HVAC) system. In one example, the air delivery system 32 may be the HVAC system. The air delivery system 32 may be operated in at least three different modes of operation. The modes of operation can include, but are not limited to, an outside air mode of operation, a recirculation mode of operation, and a partial recirculation mode of operation. These modes of operation will be discussed in further detail herein. The air delivery system 32 can perform heating functions for the cabin 28 and/or cooling functions for the cabin 28. For example, a heater core, one or more evaporators, and/or one or more condensers may be employed to control a temperature climate within the cabin 28. When the air delivery system 32 is performing cooling functions for the cabin 28, it may be preferable to utilize either the outside air mode of operation or the recirculation mode of operation. When the air delivery system 32 is performing heating functions for the cabin 28, heating performance of the cabin 28 may be enhanced by employing the recirculation mode of operation. However, while heating performance of the cabin 28 may be enhanced by employing the recirculation mode of operation, undesirable fogging of windows 88 of the vehicle 20 can occur. In such situations, the partial recirculation mode of operation may be employed to provide the enhanced heating performance while reducing undesirable fogging.

Figure 2:
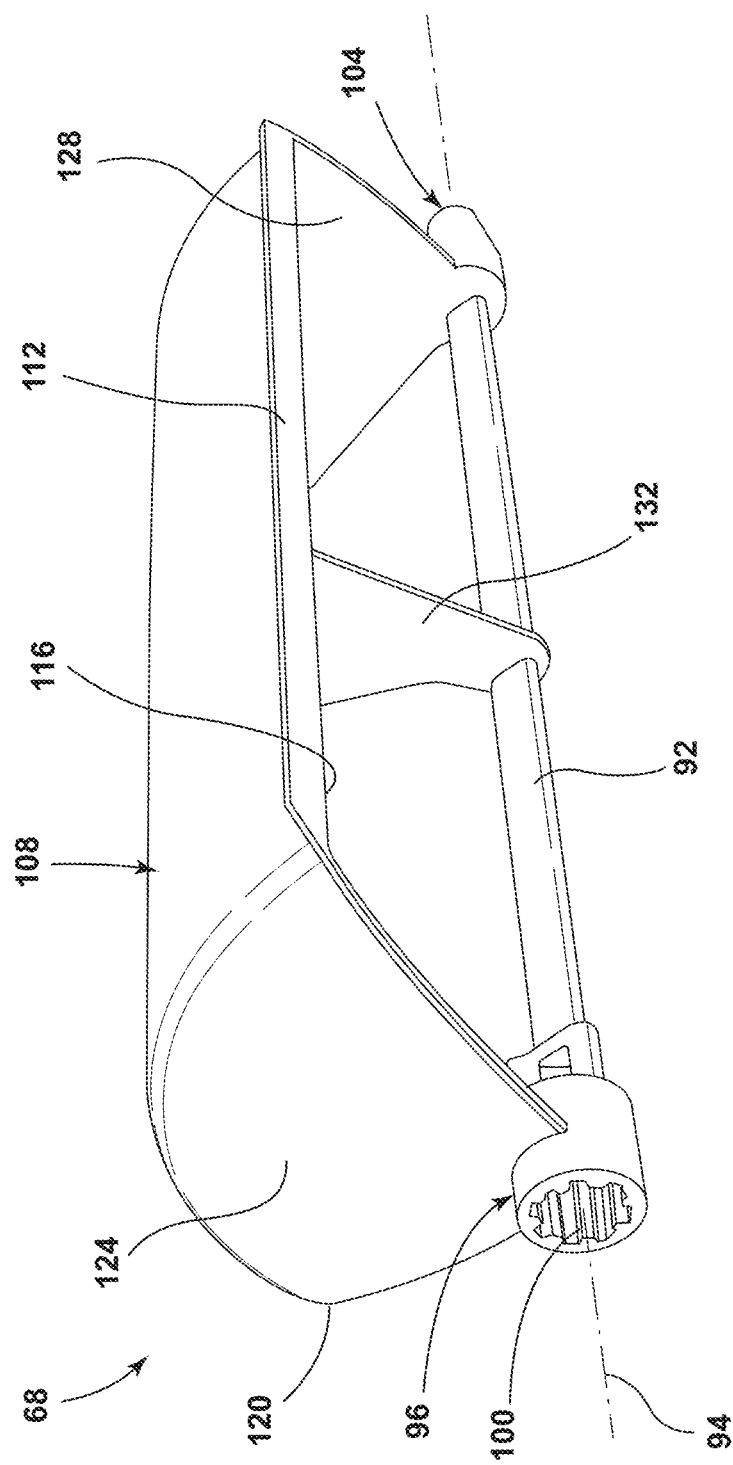
FIG. 2 is a front perspective view of a first cabin air door, according to one example.
Figure 4:
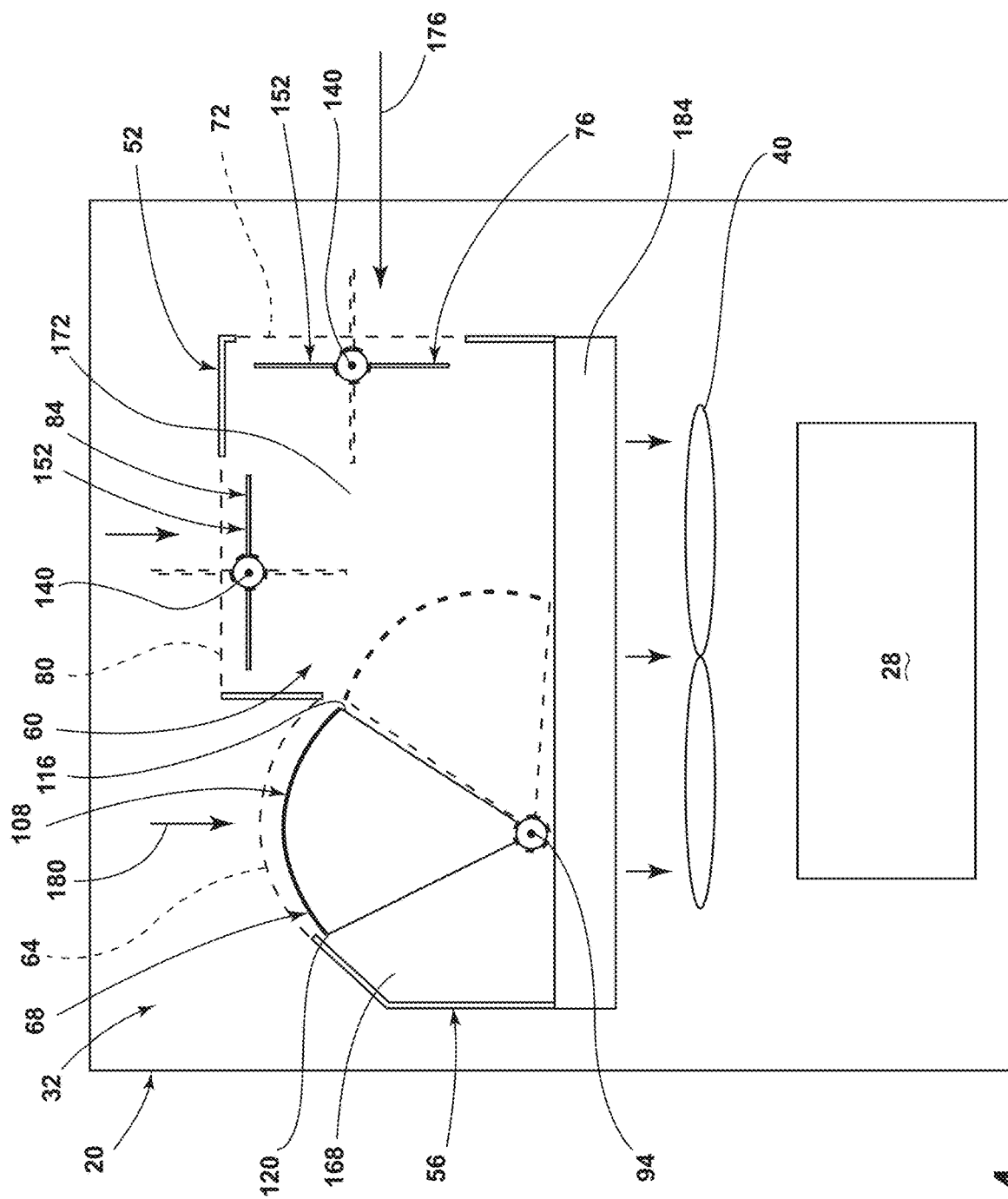
FIG. 4 is a schematic representation of the vehicle, illustrating the air delivery system, according to one example.

Referring now to FIGS. 2 and 4, the first cabin air door 68 is shown in exemplary form. The first cabin air door 68 is provided with a shaft 92 about which the first cabin air door 68 is rotated to transition between the open position and the closed position. Accordingly, the shaft 92 defines a rotation axis 94 of the first cabin air door 68. A first end 96 of the shaft 92 can define a recess 100 that receives, for example, a complementarily shaped end of a driveshaft of a motor. Accordingly, the motor for the first cabin air door 68 may be activated to induce movement of the first cabin air door 68 relative to the first cabin air aperture 64. A second end 104 of the shaft 92 may also define the recess 100. Alternatively, the second end 104 may be received within a retention opening defined by the intake module 52. In such an example, the retention opening may aid in positioning the first cabin air door 68 within the intake module 52 as the first cabin air door 68 is rotated about the shaft 92.

Referring again to FIGS. 2 and 4, a baffle 108 of the first cabin air door 68 is coupled to the shaft 92. The baffle 108 is the portion of the first cabin air door 68 that is configured to overlap, cover, or otherwise engage with the first cabin air aperture 64 to varying degrees depending on the position of the first cabin air door 68 (e.g., open position, intermediate position, or closed position). The baffle 108 can be provided with a lip 112 that extends from a first edge 116 and/or a second edge 120 thereof. The lip(s) 112 can aid in preventing air from bypassing the baffle 108 when the first cabin air door 68 is in the closed position. In various examples, the baffle 108 includes a first sidewall 124 and a second sidewall 128 that each extend toward, and engage with, the shaft 92. For example, the first sidewall 124 may couple to the first end 96 of the shaft 92 and the second sidewall 128 may couple to the second end 104 of the shaft 92. In some examples, a support leg 132 may extend from the baffle 108 to the shaft 92 at a position that is between the first sidewall 124 and the second sidewall 128.

Figure 3B:
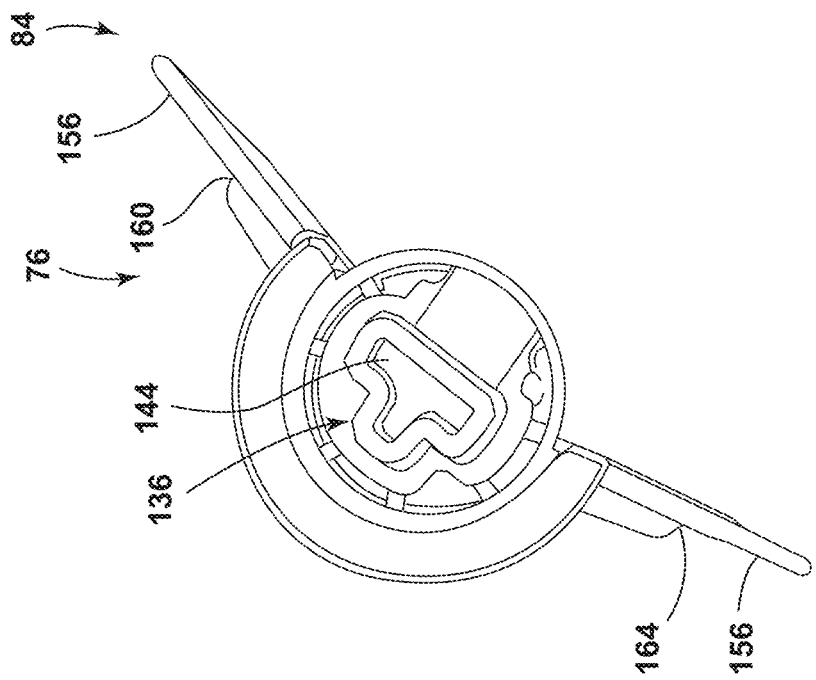
FIG. 3B is a side view of the external air door, according to one example.
Figure 3A:
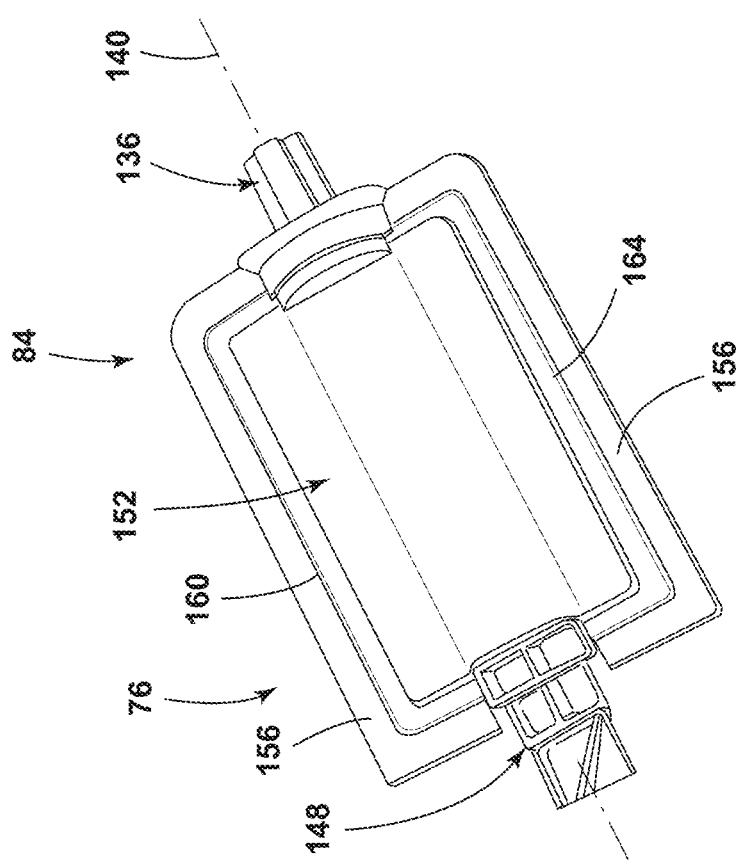
FIG. 3A is a front view of an external air door, according to one example.

Referring to FIGS. 3A-4, the external air door 76 and/or the second cabin air door 84 are shown in exemplary form. The external air door 76 and/or the second cabin air door 84 can be provided with a shaft 136 that defines a rotation axis 140. The external air door 76 and the second cabin air door 84 are configured to rotate about their corresponding rotation axes 140 as they are transitioned between the open position and the closed position. As with the first cabin air door 68, the shaft 136 of the external air door 76 and/or the second cabin air door 84 may define a recess 144 that receives, for example, a complementarily shaped end of a driveshaft of a corresponding motor (e.g., an external air door motor or a second cabin air door motor). Accordingly, the motor for the external air door 76 may be activated to induce movement of the external air door 76 relative to the external air aperture 72. Similarly, the motor for the second cabin air door 84 may be activated to induce movement of the second cabin air door 84 relative to the second cabin air aperture 80. A second end 148 of the shaft 136 may also define the recess 144. Alternatively, the second end 148 may be received within a retention opening defined by the intake module 52. In such an example, the retention opening may aid in positioning the external air door 76 or the second cabin air door 84 within the intake module 52 as the external air door 76 or the second cabin air door 84 is rotated about the shaft 136, respectively.

Referring again to FIGS. 3A-4, the external air door 76 and/or the second cabin air door 84 can be provided with a baffle 152. The baffle 152 may be coupled to the shaft 136. As with the first cabin air door 68, the baffle 152 of the external air door 76 and/or the second cabin air door 84 is configured to overlap, cover, or otherwise engage with the external air aperture 72 or the second cabin air aperture 80, respectively, to varying degrees depending on the position of the door (e.g., open position, intermediate position, or closed position). The baffle 152 can be provided with a lip 156 that extends from a first edge 160 and/or a second edge 164 thereof. In some examples, the lips 156 may extend about a substantial portion of a perimeter of the baffle 152. The lip(s) 156 can aid in preventing air from bypassing the baffle 152 when the corresponding door (e.g., the external air door 76 and/or the second cabin air door 84) is in the closed position.

With specific reference to FIG. 4, the first cabin air door 68, the second cabin air door 84, and the external air door 76 are each depicted in the closed position by solid lines. The open position of the first cabin air door 68, the second cabin air door 84, and the external air door 76 are each depicted in dashed lines. The first cabin air aperture 64, the second cabin air aperture 80, and the external air aperture 72 are each depicted in dashed lines to indicate their locations. However, the first cabin air aperture 64, the second cabin air aperture 80, and/or the external air aperture 72 may be completely open surface areas that are devoid of the housing 56 in those regions. Such an arrangement can be seen with regard to the open positions of the external air door 76 and the second cabin air door 84 as the depicted positioning would not be possible otherwise. It is contemplated that the first cabin air aperture 64, the second cabin air aperture 80, and/or the external air aperture 72 may be a series of apertures defined in the region of the housing 56 that corresponds with the first cabin air door 68, the second cabin air door 84, and/or the external air door 76, respectively. In such an arrangement, minor adjustments may be made to the external air door 76 and/or the second cabin air door 84 to facilitate operation in accordance with the concepts discussed herein.

Referring again to FIG. 4, when the first cabin air door 68 is in the open position, the cavity 60 may be divided into a first chamber 168 and a second chamber 172. Accordingly, when the first cabin air door 68 is in the open position and either the external air door 76 or the second cabin air door 84 is at least partially open (e.g., in one of the intermediate positions), outside air 176 and cabin air 180 may not significantly mix within the cavity 60 of the intake module 52, Rather, the outside air 176 and the cabin air 180 may mix after exiting the cavity 60 (e.g., at the blower 40, within the ductwork 48, or within the cabin 28). In various examples, the first cabin air door 68 and/or the second cabin air door 84 may not occupy one of the intermediate positions between the open position and the closed position during a mode of operation. Instead, in such examples, the first cabin air door 68 and/or the second cabin air door 84 may occupy the intermediate position(s) in a transitory fashion (e.g., only to transition between the open position and the closed position). Such an arrangement can prevent the outside air 176 from exiting the cavity 60 through the first cabin air aperture 64 and/or the second cabin air aperture 80 when the external air door 76 is in the open position. Therefore, it may be beneficial to maintain the second cabin air door 84 in the closed position when the external air door 76 is in the open position. When the first cabin air door 68 and the external air door 76 are each in the open position, the first cabin air door 68 may impede or block the outside air 176 from passing through the first cabin air aperture 64. A filter 184 may be provided between the cavity 60 and the blower 40. The filter 184 may capture some particulate matter that may be carried by the outside air 176 and/or the cabin air 180 (e.g., dust, pollen, dirt, etc.). The first cabin air aperture 64, the first cabin air door 68, the second cabin air aperture 80, the second cabin air door 84, the external air aperture 72, and the external air door 76 are each depicted schematically. Accordingly, the specific relative sizes of the doors and their corresponding apertures may not be to scale. When the doors are in the closed position they are configured to fully block or cover the corresponding aperture such that air, whether from the cabin or outside, is impeded from entering the cavity 60. Thus, adequate control of air flow may be maintained for the air delivery system 32.

Figure 5:
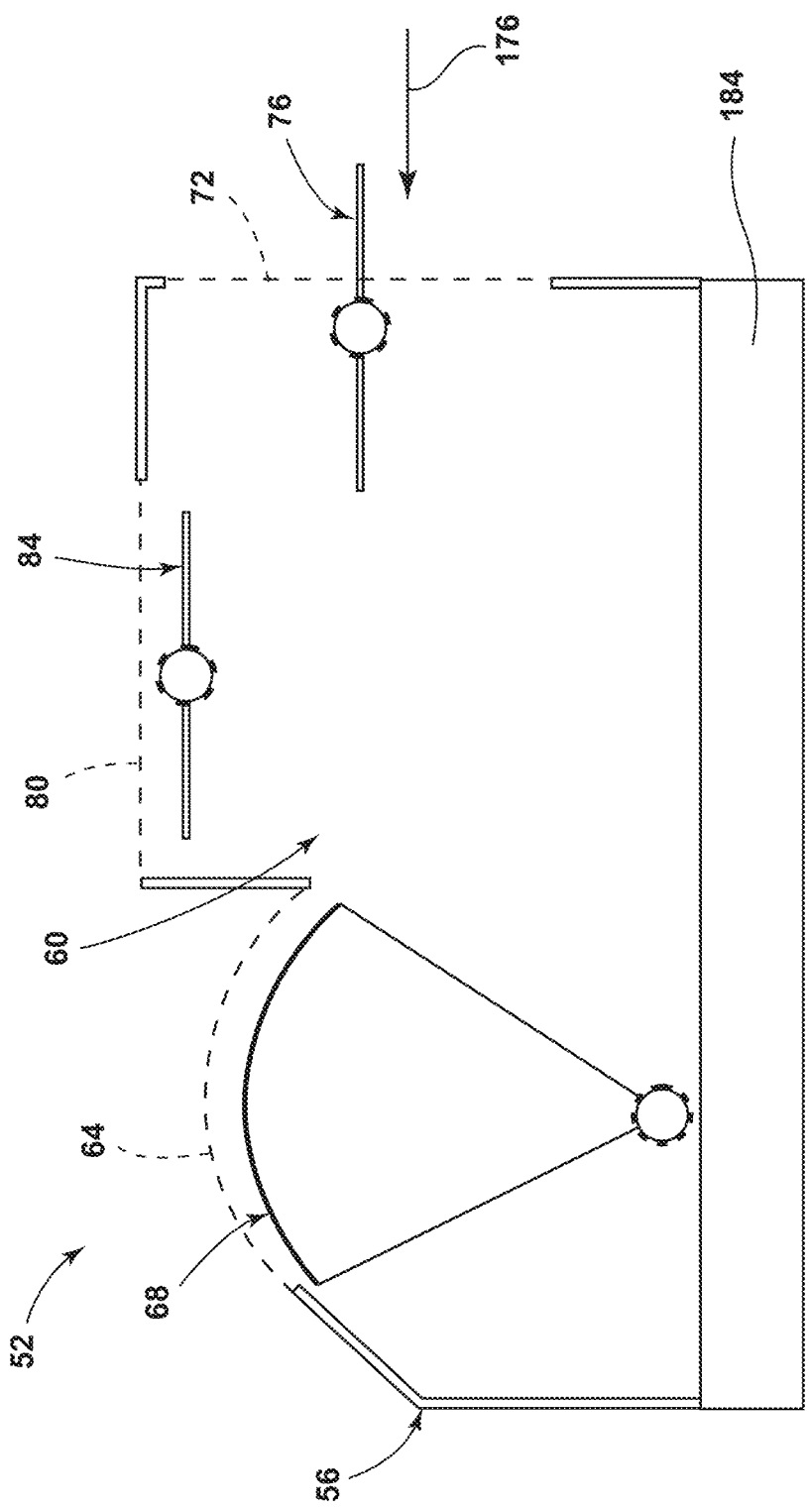
FIG. 5 is a schematic representation of an outside air mode of operation for the air delivery system, according to one example.

Referring now to FIG. 5, the outside air mode of operation for the air delivery system 32 is shown according to one example. In the outside air mode of operation, the first and second cabin air doors 68, 84 are each in the closed position and the external air door 76 is in the open position. The outside air mode of operation may be employed when either heating functionality or cooling functionality is provided to the cabin 28 by the air delivery system 32. The controller 36 can adjust the position of the external air door 76 relative to the external air aperture 72 as a function of the speed of the vehicle 20. For example, the external air door 76 may be placed in the open position during the outside air mode of operation when the vehicle 20 is stationary or when the speed of the vehicle 20 is low (e.g., 40 km/h or less). As the speed of the vehicle 20 increases, the controller 36 may decrease the speed of the blower 40. For example, the controller 36 may decrease the speed of the blower 40 to a minimum speed that is greater than zero when the vehicle 20 reaches a threshold speed (e.g., 10 km/h, 20, km/h, 30 km/h, or 40 km/h). It is contemplated that, depending on a delivery mode selection of a user, the threshold speed may differ. For example, the threshold speed when the delivery mode selected directs air only to a lower region of the cabin 28 (e.g., feet of a user) may differ from when the delivery mode selected directs air only to an upper region of the cabin 28 (e.g., upper body of a user). Similarly, threshold speed may differ when the delivery mode selected directs air to the lower region and the upper region of the cabin 28 when compared to a delivery mode selected that seeks to defog or defrost the windows 88. Accordingly, the threshold speed may include one or more threshold speeds (e.g., first threshold speed, second threshold speed, third threshold speed, etc.) with each threshold speed corresponding to a particular delivery mode. In various examples, the decrease of the speed of the blower 40 to the minimum speed may be gradual such that the speed of the blower 40 begins decreasing prior to reaching the threshold speed of the vehicle 20. For example, as the vehicle 20 approaches the threshold speed, the speed of the blower 40 may be decreased continuously or in a stepwise manner until the minimum speed of the blower 40 is reached. In such an example, the controller 36 may ensure that the speed of the blower 40 is at the minimum speed that is greater than zero at substantially the same time that the vehicle 20 reaches the threshold speed. In some examples, the decrease of the speed of the blower 40 to the minimum speed that is greater than zero may be instantaneous upon the speed of the vehicle 20 reaching the threshold speed. Said another way, once the speed of the vehicle 20 reaches the threshold speed, the controller 36 may abruptly change the speed of the blower 40 from a previous speed setting to the minimum speed that is greater than zero.

Referring again to FIG. 5, as the speed of the vehicle 20 exceeds the threshold speed, a position of the external air door 76 relative to the external air aperture 72 may be adjusted. In one example, as the speed of the vehicle 20 exceeds the threshold speed, a cross-sectional overlap between the external air door 76 and the external air aperture 72 may be increased. In such an example, as the speed of the vehicle 20 further exceeds the threshold speed, the cross-sectional overlap between the external air door 76 and the external air aperture 72 may be further increased, while not fully reaching the closed position (e.g., remaining in one of the intermediate positions). Accordingly, the cross-sectional overlap between the external air door 76 and the external air aperture 72 and/or the speed of the blower 40 may be altered as a function of the speed of the vehicle 20 in an effort to compensate for increased airflow of the outside air 176 at the external air aperture 72. In various examples, the vehicle 20 and/or the air delivery system 32 may be provided with an air pressure sensor, an air volume sensor, and/or an air speed sensor to aid in determining a given position of the external air door 76 relative to the external air aperture 72 during the outside air mode of operation. Reducing the speed of the blower 40 as the speed of the vehicle 20 increases can decrease an electrical load on a battery or batteries of the vehicle 20. By reducing the load on the battery(ies), a capacity of the battery(ies) can be maintained for a longer period of time. In examples where the vehicle 20 is an electric vehicle, gains in electrical efficiency can represent an increase in a range (e.g., distance) the vehicle 20 can travel on a given charge.

Figure 6:
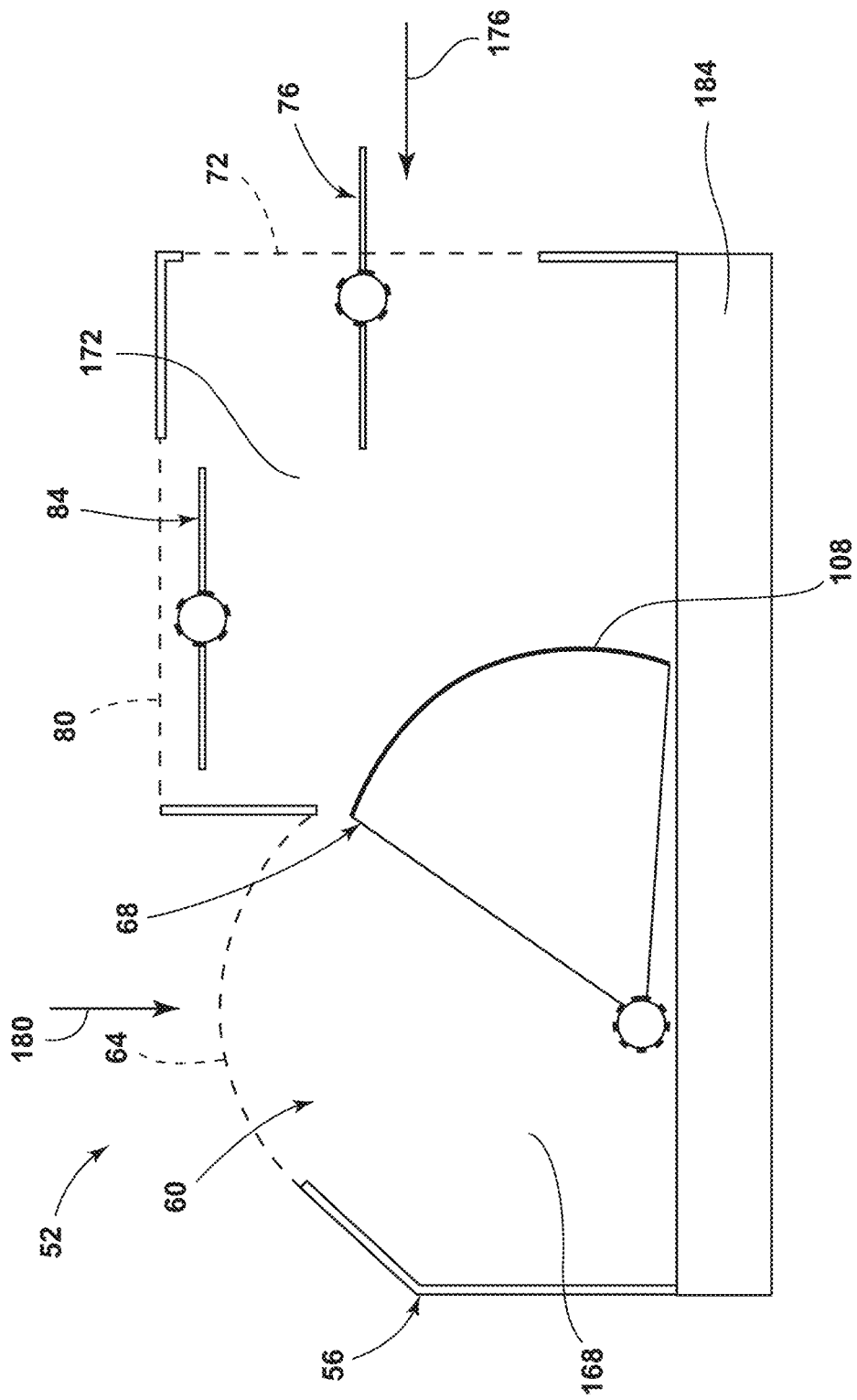
FIG. 6 is a schematic representation of a partial recirculation mode of operation for the air delivery system, according to one example.

Referring to FIG. 6, the partial recirculation mode of operation for the air delivery system 32 is shown according to one example. The partial recirculation mode of operation may be employed when either heating functionality or cooling functionality is provided to the cabin 28 by the air delivery system 32. In the partial recirculation mode of operation, the first cabin air door 68 and the external air door 76 are each in the open position and the second cabin air door 84 is in the closed position. Accordingly, the cabin air 180 that is being recirculated from the cabin 28 is introduced to the cavity 60 by the first cabin air aperture 64 and the outside air 176 from the environment that is external to the cabin 28 (e.g., outside) is introduced to the cavity 60 by the external air aperture 72. The recirculated cabin air 180 received at the first cabin air aperture 64 and the outside air 176 received at the external air aperture 72 are mixed in the cavity 60 and/or in the ductwork 48. A ratio of the cabin air 180 and the outside air 176 may be altered as the speed of the vehicle 20 increases (e.g., due to increased air pressure at the external air aperture 72). The increased air pressure at the external air aperture 72 as a result of increasing the speed of the vehicle 20 may be referred to as ram air. To counteract an increased volume of air entering the ductwork 48, the controller 36 can adjust the speed of the blower 40 and or the controller 36 can adjust a rotational position of the external air door 76 relative to the external air aperture 72. Accordingly, a cross-sectional overlap between the external air door 76 and the external air aperture 72 may be adjusted as a function of the speed of the vehicle 20.

Referring again to FIG. 6, the vehicle 20 may be provided with a humidity sensor that is coupled to the controller 36. In such an example, information provided by the humidity sensor can be utilized in determining the ratio of the outside air 176 and the cabin air 180 in an effort to mitigate fogging within the cabin 28 (e.g., on the windows 88). For example, when a humidity of the cabin air 180 is sensed to be above a predetermined threshold, the controller 36 may enter the outside air mode of operation. Accordingly, in a preferred example, the humidity sensor may sense the humidity within the cabin 28. Additionally or alternatively, the humidity sensor may sense the humidity of the outside air 176. In some examples, the vehicle 20 may be provided with a first humidity sensor that senses the humidity of the cabin air 180 and a second humidity sensor that senses a humidity of the outside air 176.

Figure 7:
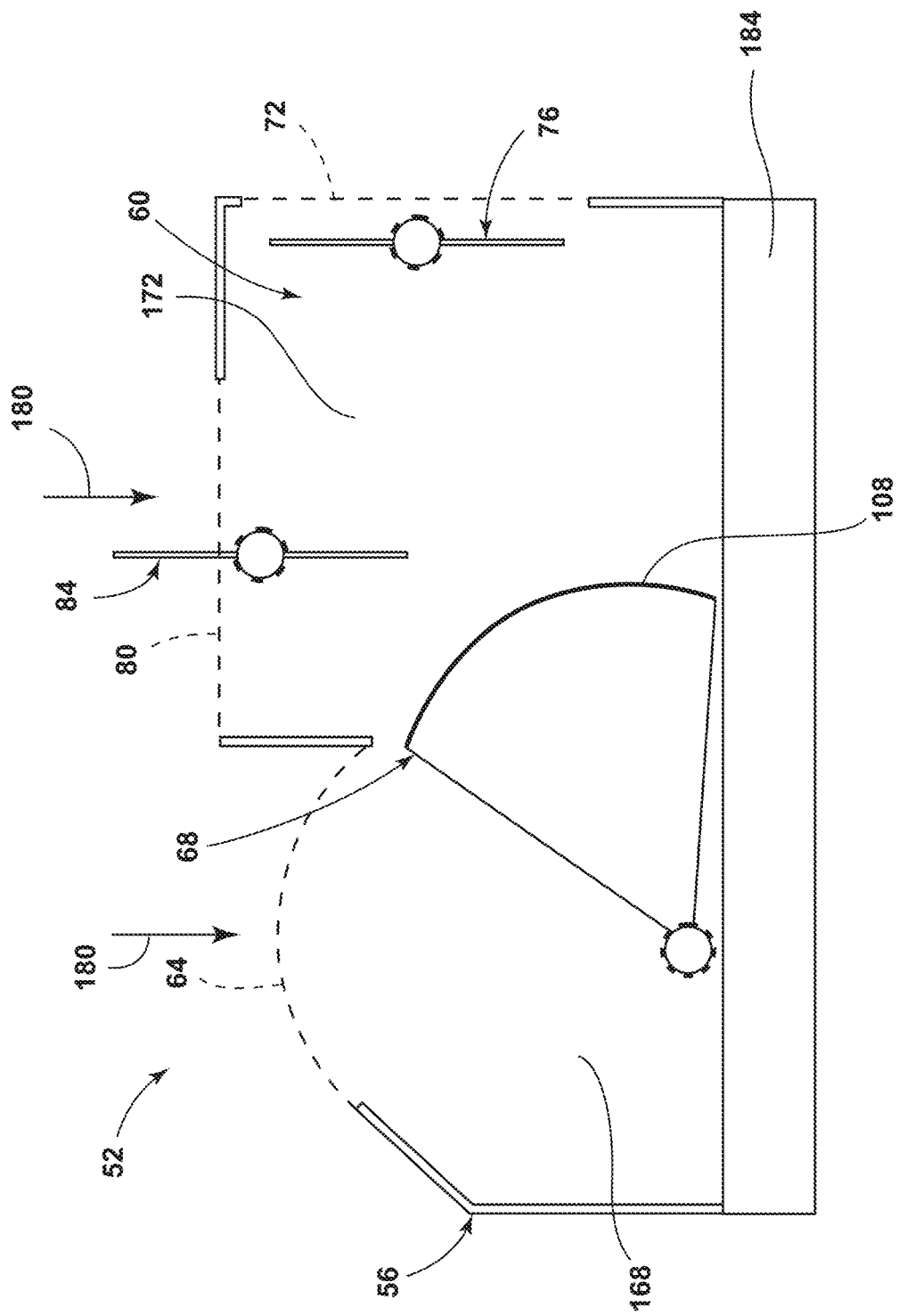
FIG. 7 is a schematic representation of a recirculation mode of operation for the air delivery system, according to one example.

Referring now to FIG. 7, the recirculation mode of operation for the air delivery system 32 is shown according to one example. The recirculation mode of operation may be employed when either heating functionality or cooling functionality is provided to the cabin 28 by the air delivery system 32. In the recirculation mode of operation, the first and second cabin air doors 68, 84 are each in the open position and the external air door 76 is in the closed position. In some examples, the controller 36 can adjust the position of the first and second cabin air doors 68, 84 relative to the first and second cabin air apertures 64, 80, respectively, to control a flow rate of air within the air delivery system 32. For example, at higher speeds of the blower 40 the first and second cabin air doors 68, 84 may each be in the open position. However, at lower speeds of the blower 40 (e.g., less demand from a user), the first and second cabin air doors 68, 84 may each be placed in an intermediate position. Alternatively, at lower speeds of the blower 40, one of the first and second cabin air doors 68, 84 may be in the open position while the other of the first and second cabin air doors 68, 84 is in the closed position. It may be beneficial for the controller 36 to adjust the speed of the blower 40 rather than adjust the positioning of the first cabin air door 68 and/or the positioning of the second cabin air door 84 in an effort to control the flow rate of air within the air delivery system 32. For example, controlling the speed of the blower 40 rather than the position of the first cabin air door 68 and/or the second cabin air door 84 may provide the desired flow rate of air through the air delivery system 32 while decreasing electrical energy consumption and/or decreasing noise within the cabin 28. In the recirculation mode of operation, the speed of the vehicle 20 may not be a factor in determining the positioning of the first and second cabin air doors 68, 84.

It is contemplated that, in various examples, the second cabin air aperture 80 and the second cabin air door 84 may be omitted. However, in such examples, the dimensions of the first cabin air aperture 64 and/or the first cabin air door 68 may need to be increased to facilitate a desired airflow. In examples that omit the second cabin air aperture 80 and the second cabin air door 84, the positioning of the first cabin air door 68 and the external air door 76 in the various modes of operation may remain unchanged.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle, comprising:
a body;
a cabin that is defined by the body; and
an air delivery system, the air delivery system comprising:
 a blower;
 an air register positioned within the cabin;
 ductwork that extends between the blower and the air register;
 an intake module positioned upstream of the blower, the intake module comprising:
  a housing that defines a cavity;
  a first cabin air aperture defined by the housing;
  a first cabin air door that is movable between an open position and a closed position relative to the first cabin air aperture;
  an external air aperture defined by the housing; and
  an external air door that is movable between an open position and a closed position relative to the external air aperture; and
 a controller that adjusts a speed of the blower as a function of a speed of the vehicle, wherein the controller decreases the speed of the blower as the speed of the vehicle increases, and wherein the controller gradually decreases the speed of the blower as the speed of the vehicle increases such that the speed of the blower reaches a minimum speed that is greater than zero as the vehicle reaches a threshold speed, and wherein as the speed of the vehicle exceeds the threshold speed, a position of the external air door relative to the external air aperture is adjusted.

2. The vehicle of claim 1, wherein as the speed of the vehicle exceeds the threshold speed, a cross-sectional overlap between the external air door and the external air aperture is increased.

3. A vehicle, comprising:
a body;
a cabin that is defined by the body; and
an air delivery system, the air delivery system comprising:
 a blower;
 an air register positioned within the cabin;
 ductwork that extends between the blower and the air register;
 an intake module positioned upstream of the blower, the intake module comprising:
  a housing that defines a cavity;
  a first cabin air aperture defined by the housing;
  a first cabin air door that is movable between an open position and a closed position relative to the first cabin air aperture;
  an external air aperture defined by the housing;
  an external air door that is movable between an open position and a closed position relative to the external air aperture;
  a second cabin air aperture defined by the housing; and
  a second cabin air door that is movable between an open position and a closed position relative to the second cabin air aperture
 a controller that adjusts a speed of the blower as a function of a speed of the vehicle, wherein the controller decreases the speed of the blower as the speed of the vehicle increases.

4. The vehicle of claim 3, wherein the first cabin air door and the second cabin air door are each in the closed position and the external air door is in the open position during an outside air mode of operation of the air delivery system.

5. The vehicle of claim 4, wherein the controller increases a cross-sectional overlap between the external air door and the external air aperture as the speed of the vehicle increases.

6. The vehicle of claim 3, wherein the first cabin air door and the second cabin air door are each in the open position and the external air door is in the closed position during a recirculation mode of operation of the air delivery system.

7. The vehicle of claim 3, wherein the first cabin air door and the external air door are each in the open position and the second cabin air door is in the closed position during a partial recirculation mode of operation of the air delivery system.

8. The vehicle of claim 7, wherein the controller increases a cross-sectional overlap between the external air door and the external air aperture as the speed of the vehicle increases.

9. The vehicle of claim 3, wherein the cavity is divided into a first chamber and a second chamber when the first cabin air door is in the open position.

10. A vehicle, comprising:
a body;
a cabin that is defined by the body; and
an air delivery system, the air delivery system comprising:
 a blower;
 an air register positioned within the cabin;
 ductwork that extends between the blower and the air register; and
 an intake module positioned upstream of the blower, wherein the intake module comprises:
  a housing that defines a cavity;
  a first cabin air aperture defined by the housing;
  a first cabin air door that is movable between an open position and a closed position relative to the first cabin air aperture;
  an external air aperture defined by the housing;
  an external air door that is movable between an open position and a closed position relative to the external air aperture;
  a second cabin air aperture defined by the housing; and a second cabin air door that is movable between an open position and a closed position relative to the second cabin air aperture; and a controller that adjusts at least one parameter as a function of a speed of the vehicle, wherein the at least one parameter is chosen from a speed of the blower and a position of the external air door.

11. The vehicle of claim 10, wherein the controller gradually decreases the speed of the blower as the speed of the vehicle increases such that the speed of the blower reaches a minimum speed that is greater than zero when the speed of the vehicle reaches a threshold speed.

12. The vehicle of claim 11, wherein the controller increases a cross-sectional overlap between the external air door and the external air aperture as the speed of the vehicle increases beyond the threshold speed.

13. The vehicle of claim 10, wherein the first cabin air door and the second cabin air door are each in the closed position and the external air door is in the open position during an outside air mode of operation of the air delivery system.

14. The vehicle of claim 10, wherein the first cabin air door and the second cabin air door are each in the open position and the external air door is in the closed position during a recirculation mode of operation of the air delivery system.

15. The vehicle of claim 10, wherein the first cabin air door and the external air door are each in the open position and the second cabin air door is in the closed position during a partial recirculation mode of operation of the air delivery system.

16. The vehicle of claim 10, wherein the cavity is divided into a first chamber and a second chamber when the first cabin air door is in the open position.

* * * * *